United States Patent
Kehler

[11] 3,908,482
[45] Sept. 30, 1975

[54] COAXIAL GEAR SYSTEM FOR BELLYLESS VEHICLES

[76] Inventor: Paul Kehler, 17305 Fergus Dr., South Bend, Ind. 46635

[22] Filed: Mar. 7, 1974

[21] Appl. No.: 448,957

[52] U.S. Cl. .......... 74/675; 74/710; 180/6.7; 180/9.2
[51] Int. Cl..... F16h 37/06; F16h 1/38; B62d 11/00
[58] Field of Search .......... 74/710, 675; 180/9, 9.2, 180/6.7, 22, 24.03, 88

[56] References Cited
UNITED STATES PATENTS

| | | | |
|---|---|---|---|
| 1,081,643 | 12/1913 | Wills | 74/675 X |
| 2,300,424 | 11/1942 | Jones | 74/675 |
| 3,076,354 | 2/1963 | Kaplan | 74/675 |
| 3,371,733 | 3/1968 | Kehler | 180/6.7 |
| 3,456,750 | 7/1969 | Kehler | 180/9.2 X |
| 3,494,222 | 2/1970 | Hirota et al | 74/675 X |
| 3,799,284 | 3/1974 | Hender | 74/675 X |

Primary Examiner—Samuel Scott
Assistant Examiner—P. S. Lall

[57] ABSTRACT

A coaxial gear system for the powering of bellyless vehicles, comprising a set of coaxially mounted differential gear trains, said gear trains comprising two input shafts and one output shaft, said output shafts rotating at an angular speed that is intermediate the speeds of the two input shafts, with each of the gear trains designed to allow connection of its output shaft to input shafts of the two adjacent differential gear trains of the coaxial set, and to allow connection of its two input shafts to the output shafts of the two adjacent differential gear trains of the coaxial set.

10 Claims, 7 Drawing Figures

FIGURE 1
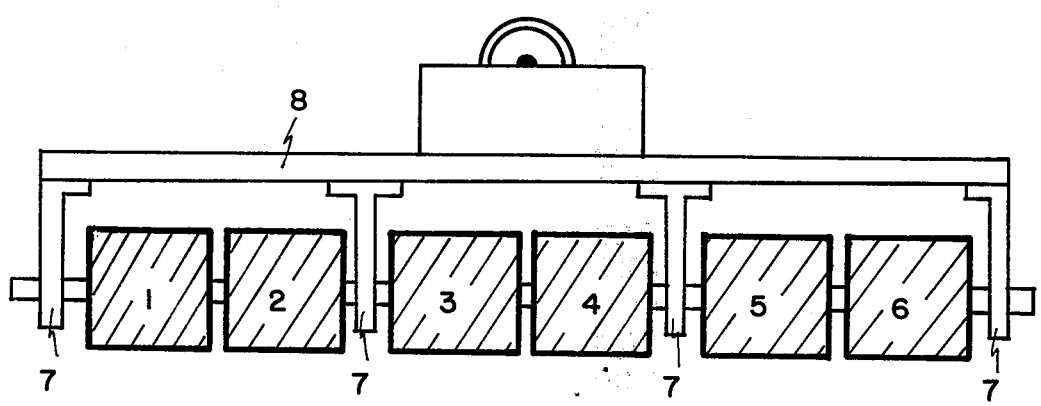
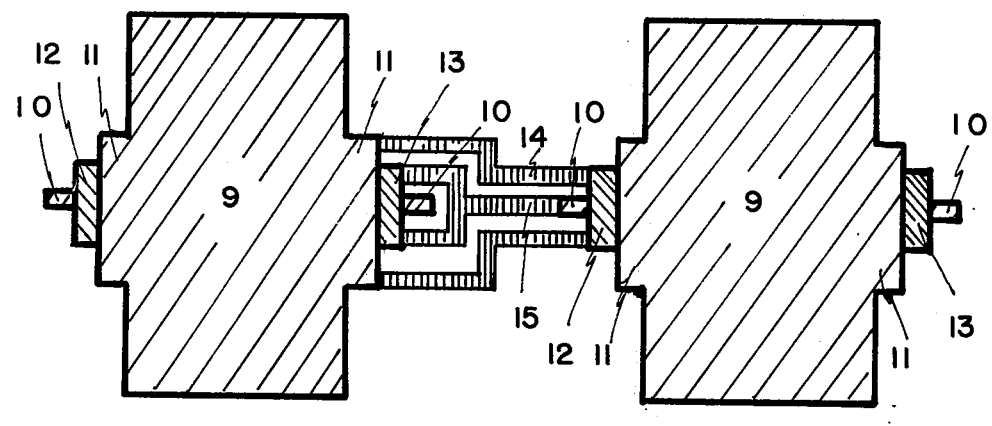
FIGURE 2

FIGURE 3
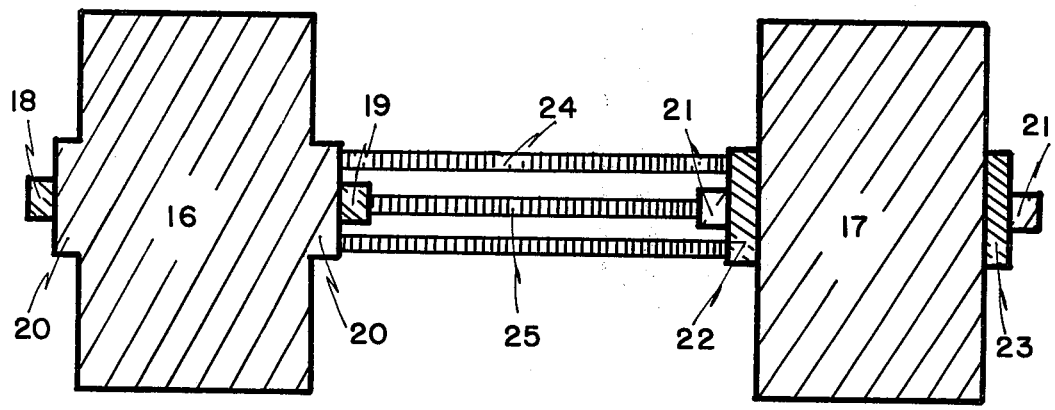
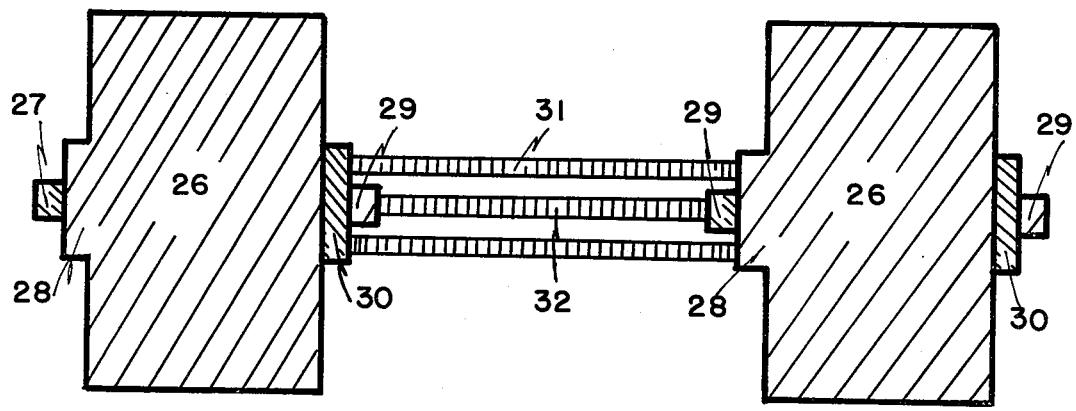
FIGURE 4

COAXIAL GEAR SYSTEM FOR BELLYLESS VEHICLES

In a general sense, a differential gear train is an arrangement of gears where the ratio of the unit can be changed by driving into the unit with a second drive. There are dozens of arrangements of gears that serve this purpose and that can be classified as free differentials or as fixed differentials. Free differentials have two inputs and one output or two outputs and one input and are used to vary shaft speed ratios. In fixed differentials, one member of the gear train is held in fixed position, with the other two members serving as the input and the output.

The present invention deals with free differentials that have two inputs and one output. The novel design of these differentials allows for coaxial mounting of a multiplicity of units, and for interconnection of these units so that the angular speed of the outputs changes gradually from unit to unit throughout the whole set of differentials, when two different inputs are applied to the ends of the set. Such gradual speed change along the coaxially mounted units of the set is found when both ends of the set are driven at different speeds, or when only one end of the set is driven and the other one is held fixed.

A multiplicity of output shafts with gradually changing angular speeds spaced equally between two input speeds, can find useful technical application in several areas. Most important, probably, is the use of such a set of coaxially mounted differentials for the powering of the inner wheels or tracks of bellyless all terrain vehicles, as described in U.S. Pat. Nos. 3,371,733 and 3,456,750, in the U.S. Pat. application Ser. No. 420285, and in the copending patent application for an ALL TERRAIN VEHICLE submitted concurrently with the present application. One embodiment of a fully tracked bellyless vehicle, utilzing a coaxial set of differentials, is illustrated in the appended drawings.

While bellyless all terrain vehicles can be powered by a wide variety of differential gear trains, coaxial sets of differentials are most suitable.

The main object of the present invention is, therefore, to show how differential gear trains can be designed for coaxial mounting of multiplicity of such differentials in a set in which there is a gradual change between the outputs of the individual differentials, whenever there is a difference in the inputs to the set. This invention was conceived earlier and disclosed to the Patent Office in Disclosure Document No. 00943, filed by me on 6 March 1972 for a COAXIAL SET OF DIFFERENTIAL GEAR TRAINS.

The differential gear trains described in this specification are connected in such a manner that the output of each differential moves at a speed that is intermediate the speeds of the outputs of the two adjacent differentials of the set. This relation is achieved by connecting the output of each differential to inputs of its two adjacent differentials, and by connecting the inputs of each differential to the outputs of its two adjacent differentials.

The novel features which I believe to be characteristic of this invention are set forth in the appended claims. The principles of the invention, however, are best understood from the following description of specific embodiments of the invention, read in connection with the accompanying drawings, in which:

FIG. 1 is the front elevation of a tracked bellyless vehicle employing a coaxial set of differentials for powering of its tracks, FIG. 2 presents significant design features of a symmetric differential that can be used for the construction of a coaxial set, FIG. 3 presents significant design features of a pair of symmetric differentials that can, when mounted alternately, be used for the construction of a coaxial set, FIG. 4 presents significant design features of a non-symmetric differential that can be used for the construction of a coaxial set, FIG. 7 illustrates schematically a differential that is a bevel gear train, FIG. 6 illustrates schematically a differential that is a spur gear train, and FIG. 5 illustrates schematically a differential that is a compound epicyclic train of gears.

Reference will now be made by using numerals which designate corresponding parts shown in the FIGS. 1 to 7.

The general layout of a coaxial set of differentials, mounted on an all terrain vehicle, is shown in FIG. 1. The vehicle shown in this Figure is a fully tracked, bellyless vehicle for use on extremely soft terrain. The whole underside of this vehicle is substantially covered by powered endless tracks which are driven by the wheels 1, 2, 3, 4, 5 and 6. The wheels 1 and 6 are driven directly by the power plant of the vehicle. All wheels are interconnected by shafts that are held in coaxial position by the pillow blocks 7, which are attached to the main body 8. Differential gear trains are housed within the wheels 2, 3, 4 and 5. The driving surfaces of these wheels are rigidly attached to the spider or planet carrier of the differentials, which are the outputs of the differentials. Independent of the details of their construction, the differentials are designed in such a manner, that their output rotates at an angular speed that is intermediate the angular speeds of the two inputs of the differential.

The output of each differential is connected to inputs (or to the input) of adjacent differentials (or differential). The inputs of each differential are connected to the driving surfaces of adjacent units of the set. Defining, in FIG. 1, each of the differentials housed in 2, 3, 4 and 5 to have a left input, an output and a right input, it can then be said, that the driving surface of wheel 1 is connected to the left input of wheel 2, that the driving surface of wheel 2 is connected to the left input of wheel 3, that the right input of wheel 2 is connected to the driving surface of wheel 3 (which is also connected to the left input of wheel 4), and so on.

Double, concentric shafts are required for a connection of coaxial differentials as described above. The differentials themselves can be of various designs. They can be, for example, bevel gear trains, spur gear trains, or compound epicyclic trains of gears. By the characteristic design of their takeoffs, however, all these differentials can be classified as differentials of symmetric type, as pairs of differentials of symmetric type, or as differentials of non-symmetric type. These three different types of differentials suitable for assembly into coaxial sets are illustrated in the FIGS. 2, 3 and 4.

FIG. 2 shows the take-offs of, and the interconnections between, the differential gear trains of a coaxial set of identical, symmetric differentials. Both the shown differentials 9 are of the identical design. Both are fully symmetric and have three take-offs on each side. The inner take-offs 10 are the outputs of the differentials and are connected to the housing 9 and the outer take-offs 11. The two input gears of each differential are connected to the intermediate take-off 12 (left input) and the intermediate take-off 13 (right input). The FIG. 7 is one example for the details of design of such a symmetric differential.

Two concentric shafts connect the differentials shown in FIG. 2 in the prescribed manner: the outer shaft 14 connects the output of the left differential to the left input of the right differential, and the inner shaft 15 connects the output of the right differential to the right input of the left differential. A coaxial set of differentials comprising any number of differential gear trains can be assembled from individual symmetric differentials as shown in FIG. 2.

The FIG. 3 shows the take-offs of, and the interconnections between, the differential gear trains of a coaxial set of paired, symmetric differentials. Both differentials shown in FIG. 3 are symmetric since they have two equivalent takeoffs on each side. The two differentials differ in design, however, inasmuch as their take-offs are reversed: the inner take-offs 18 and 19 of the differential 16 are connected to the left and the right inputs of the differential. The outer takeoffs 20 are connected to the output of the differential 16. On the differential 17, the take-offs are reversed: the inner take-offs 21 are connected to the output of the differential, and the outer take-offs 22 and 23 are connected to the left and the right inputs of the differential. FIG. 6 is an illustration of one embodiment of a paired symmetric set as shown in FIG. 3. Two concentric shafts connect the differentials shown in FIG. 3 in the prescribed manner: the outer shaft 24 connects the output of the differential 16 to the left input of the differential 17, and the inner shaft 15 connects the output of the differential 17 to the right input of the differential 16. A coaxial set of differentials comprising any number of differential gear trains can be assembled from pairs of symmetric differentials as shown in FIG. 3, by mounting alternately the two types of differentials shown in this Figure.

The FIG. 4 shows the take-offs of, and the interconnections between, the differential gear trains of a coaxial set of identical, non-symmetric differentials. Both the shown differentials 26 are of identical design. Both are non-symmetric, since the take-offs on their two sides are different: The inner take-offs on the left side of the differentials 26 are connected to the left input, and the outer take-offs on the left side are connected to the output of the differentials. On the right side, the take-offs are reversed: The inner take-off 29 is connected to the output of the differentials 26, and the outer take-off 30 is connected to the right input. FIG. 5 illustrates one example for a detailed design of such non-symmetric differentials. Two concentric shafts connect the differentials shown in FIG. 4 in the prescribed manner: The outer shaft 31 connects the right input of the left differential to the output of the right differential, and the inner shaft 32 connects the output of the left differential to the left input of the right differential. A coaxial set of differentials comprising any number of differential gear trains can be assembled fron non-symmetric differentials such as shown in FIG. 4.

A large number of different arrangements of gears can be designed by those knowledgeable in the art for each of the three types of differentials illustrated in the FIGS. 2, 3, and 4. The following FIGS. 5, 6, and 7, illustrating details of various differential gear systems, are therefore presented only for illustrative purposes and for the better understanding of the three different types of differentials shown in the FIGS. 2, 3, and 4.

Figures 5, 6, 7:
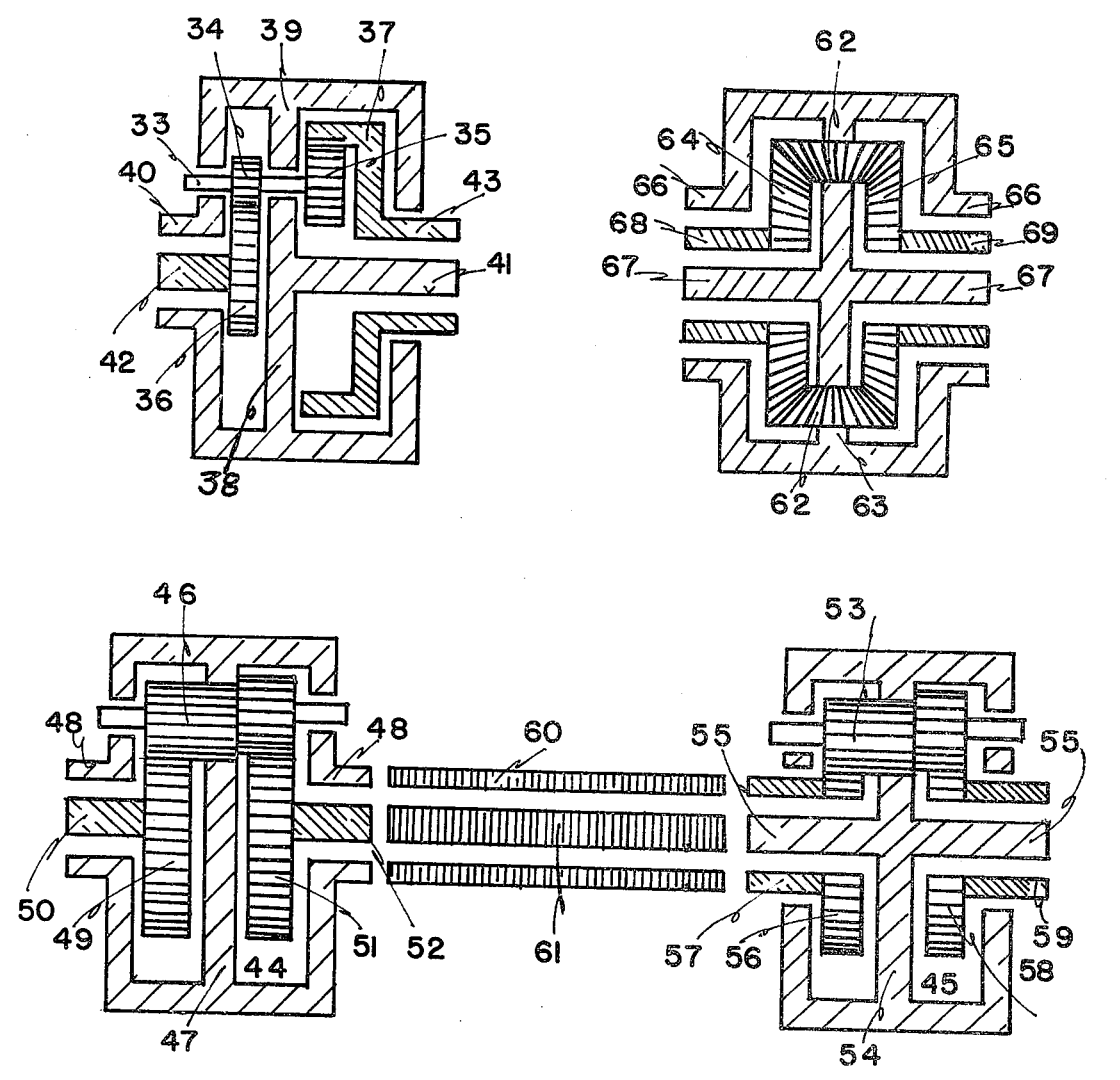

FIG. 5 shows a compound epicyclic train of gears in which the spindle 33 couples the outer planet 34 and the inner planet 35. The outer planet 34 engages with the left input of the differential, the sun 36. The inner planet 35 engages with the right input of the differential, the annulus 37. Spindle 33 rotates with the planet carrier 38 which is rigidly connected to the housing 39, to the left outer take-off 40 and to the right inner take-off 41. The inner take-off 42 is connected to the left input, the sun 36, and the outer take-off 43 is connected to the right input, the annulus 37. Thus, the arrangement of take-offs is identical to that shown for the non-symmetric differentials in FIG. 4. Obviously, compound epicyclic differentials can also be designed to have take-offs arranged in the manner shown in the FIGS. 2 and 3.

The FIG. 6 shows a pair of spur gear differentials 44 and 45 in which the spider gears 46 and 53, carried by the spiders 47 and 54, engage the input gears 49 and 51 and the input gears 56 and 58. In the differential 44, the spider is connected to the gear housing and to the outer take-offs 48. The input gear 49 is connected to the inner take-off 50, and the input gear 51 is connected to the inner take-off gear 52. In the differential 45, the spider 54 is connected to the gear housing and the inner take-offs 55. The input gear 56 is connected to the outer take-off 57, and the input gear 58 is connected to the outer take-off 59. The outer shaft 60 connects the output of the differential 44, i.e., the spider 47, to the left input 56 of the differential 45, by connecting the outer takeoff 48 of the differential 44 to the outer take-off 57 of the differential 45. The inner shaft 61 connects the right input 51 of the differential 44 to the output of the differential 45, i.e., its spider 54, by connecting the inner take-off 52 of the differential 44 to the inner take-off 55 of the differential 45. Thus, the arrangement of take-offs and connections is identical to that for the pair of symmetric differentials shown in FIG. 3. Obviously, spur gear differentials can also be designed to have take-offs arranged in the manner shown in the FIGS. 2 and 4.

The FIG. 7 shows a symmetric bevel gear differential in which the spider gears 62, carried by the spider 63, engage the two input gears 64 and 65. The output of the differential, the spider 63, is connected to the gear housing, to the outer takeoffs 66 and to the inner take-offs 67. The input gear 64 is connected to the intermediate take-off 68, and the input gear 65 is connected to the intermediate take-off 69. Thus, the arrangement of take-offs is identical to that shown for symmetric differential gears in FIG. 2. Obviously, bevel gear differentials can also be designed to have take-offs arranged in the manner shown in the FIGS. 3 and 4.

The preceding description and the FIGS. 1 to 7 show how various kinds of differential gear trains can be designed to have symmetric or non-symmetric take-offs suitable for assembly of coaxial sets of differentials. Such sets of differentials gradually differentiate between the speeds of two inputs to the coaxial set. One possible application for such a set of coaxial differentials is shown to be the gear train for a soft-terrain vehicle.

Although specific embodiments of the invention have been illustrated and described, it is understood that various alterations in the details of construction can be made without departing from the scope of the invention which is indicated in the appended claims.

I claim:

1. A coaxial gear system for bellyless vehicles, said bellyless vehicles comprising two outer tracks or two outer rows of wheels and a multiplicity of inner tracks or a multiplicity of inner rows of wheels, said outer tracks or outer rows of wheels being directly and independently powered by the power plant of said bellyless vehicle, and said inner tracks or inner rows of wheels being individually powered by the differential gear trains comprising said coaxial gear system in such a manner that each inner track or each inner row of wheels rotates at an angular speed that is intermediate the angular speeds of its two adjacent tracks or rows of wheels.

2. A coaxial gear system for bellyless vehicles according to claim 1, said coaxial gear system comprising a set of differentials capable of gradual and uniform differentiation between the speeds of two independent inputs, said set of differentials comprising a coaxially mounted multiplicity of differential gear trains, said differential gear trains comprising two input gears and one output gear that rotates at a speed that is intermediate the speeds of said two input gears, said two independent inputs to said set of differentials being applied to the two outer input gears of the two outer differential gear trains of said set of differentials, said differentiation of speeds being caused by an interconnection of said input gears and said output gears of said differential gear trains in such a manner that the output gears of each of said differential gear trains rotate at a speed that is intermediate the speeds of the output gears of the two differential gear trains mounted adjacent to each of said differential gear trains mounted adjacent to each of said differential gear trains or rotate at a speed that is intermediate the speeds of the output gear of the only adjacent differential gear train and of one of said two independent inputs, said interconnection of said gears being accomplished by connecting said output gears of each of said differential gear trains to input gears of its adjacent differential gear trains or gear train, and by connecting said input gears of each of said differential gear trains to the output gears of its two adjacent differential gear trains or to the output gear of its only adjacent differential gear train and to one of said two independent inputs.

3. A set of differentials according to claim 2, wherein said differential gear trains comprise three concentric take-offs on each side, wherein the innermost take-off is connected to said output gear of said differential gear train, wherein the intermediate take-off on the first side of said differential gear train is connected to the first input gear and the intermediate take-off on the second side is connected to the second input gear of said differential gear train, and wherein the outermost take-off is connected to said output gear of said differential gear train.

4. A set of differentials according to claim 3, wherein said differential gear trains are bevel gear differentials.

5. A set of differentials according to claim 3, wherein said differential gear trains are spur gear differentials.

6. A set of differentials according to claim 3, wherein said differential gear trains are compound epicyclic trains of gears.

7. A set of differentials according to claim 2, wherein said set is an alternate arrangement of a first and a second design of said differential gear trains and wherein both designs comprise two concentric take-offs on each side, wherein the first inner take-off of said first design is connected to the first input gear of said first design and the second inner take-off of said first design is connected to the second input gear of said first design, wherein the outer takeoffs of said first design are connected to said output gear of said first design, wherein the inner takeoffs of said second design are connected to said output gear of said second design, and wherein the first outer takeoff of said second design is connected to the first input gear of said second design and the second outer takeoff of said second design is connected to the second input gear of said second design.

8. A set of differentials according to claim 7, wherein said differential gear trains are bevel gear differentials.

9. A set of differentials according to claim 7, wherein said differential gear trains are spur gear differentials.

10. A set of differentials according to claim 7, wherein said differential gear trains are compound epicyclic trains of gears.

* * * * *